A. D. BERKELEY 2,754,605

CHANGEABLE DISPLAY MECHANISMS

Filed Dec. 24, 1949

INVENTOR.
Arnold D. Berkeley
BY George H. Corey
ATTORNEY

July 17, 1956 A. D. BERKELEY 2,754,605
CHANGEABLE DISPLAY MECHANISMS
Filed Dec. 24, 1949 6 Sheets-Sheet 3

INVENTOR.
Arnold D. Berkeley
BY
George M. Corey
ATTORNEY

July 17, 1956 A. D. BERKELEY 2,754,605
CHANGEABLE DISPLAY MECHANISMS
Filed Dec. 24, 1949 6 Sheets-Sheet 5

INVENTOR.
Arnold D. Berkeley
BY George Morey
ATTORNEY

July 17, 1956  A. D. BERKELEY  2,754,605
CHANGEABLE DISPLAY MECHANISMS
Filed Dec. 24, 1949  6 Sheets-Sheet 6

INVENTOR.
Arnold D. Berkeley
BY George N. Corey
ATTORNEY

United States Patent Office 2,754,605
Patented July 17, 1956

2,754,605

CHANGEABLE DISPLAY MECHANISMS

Arnold D. Berkeley, New York, N. Y.

Application December 24, 1949, Serial No. 134,893

25 Claims. (Cl. 40—31)

The invention relates to changeable display mechanisms for exhibiting in sequence a plurality of individual images, such as advertisements, pictures and so forth.

An object of the invention is to provide a changeable display mechanism in which the changing of images is accomplished rapidly and in a manner not apparent to an observer.

Another object is to provide a changeable display mechanism including means for providing novel optical effects during an individual display. Such optical effects may include color changes or the movement, or appearance or disappearance of components of the display.

Another object is to provide, in such a changeable display mechanism, improved means for masking or concealing changing of images from an observer. A further object is to provide such a masking means in the form of an improved screen which moves between the displays and the observer. A further object is to provide an additional display on the side of the screen toward the observer and to provide suitable lighting facilities for the additional display.

A further object is to provide, in a changeable display mechanism of the type described, improved means for controlling the movement of the display images and of the masking means. Such improved control means includes means for varying the duration of the period of exhibition of one or more of the indivdual displays so that said period is different than it is for other displays. Such controls also include certain controls operated by the display movements and other controls operated by timing mechanism, and means for maintaining synchronism between the movement-operated and time-controlled controls.

A further object of the invention is to provide, in a changeable display mechanism of the double reel and moving web type, an improved web and reel construction. A further object is to provide a web having a frame constructed of steel tapes or bands so that the web may be subjected to rapid acceleration and deceleraiton without damaging the relatively fragile display members carried by the web. A further object is to provide in the reels an improved spring mechanism which takes up slack in the web, cushions shocks due to sudden starting and stopping of the reels, and compensates for variations due to the varying diameter of the reels as the web is wound and unwould from them.

A further object of the invention is to provide a changeable display mechanism in which one or more of the displays may include apparatus for producing a three-dimensional effect.

Another object of the invention is to provide a changeable display mechanism in which the number of individual images to be displayed may be readily changed without affecting operation of the mechanism as a whole.

Another object of the invention is to provide a changeable display mechanism which is compact and particularly one in which the depth, i. e., the dimension perpendicular to the plane of the display window, is minimized.

The foregoing and other objects of the invention are accomplished, in the embodiment of the invention described herein, by providing one double reel and web mechanism in which the web carries the several displays to be exhibited, and a second double reel and web mechanism arranged so that the second web passes between the first web and the observer. Certain portions of the second web are made opaque so as to mask the display web. Other portions are made transparent so that the display web may be viewed through them. Some of the transparent portions may be colored so as to change the color of the display web when viewed through those portions. In certain cases, some elements of the display may be printed or otherwise impressed on one of the transparent portions of the second web. When such a structure is used, the image viewed by an observer is a composite one consisting of a portion on the first web and a portion on the second web.

Suitable control apparatus is provided for intermittently moving the two webs. The display web is moved only when it is masked by an opaque portion of the second or screen web. When the display web may be viewed through the transparent portions of the screen web, the display web is held stationary. Timing mechanism is provided for initiating the successive movements of the respective webs. The termination of movement of the webs is preferably controlled by mechanism operated by the webs as they move into their desired positions.

The number of displays to be exhibited may be varied. The time of exhibition of each individual display may be separately determined. Mechanism is also provided for selecting the particular transparent portions of the screen web through which a given display is to be viewed.

Other objects and advantages will become apparent from a consideration of the appended specification, claims and drawings, in which:

Referring now to Figs. 1 to 5, there is shown a base 1 which supports the changeable display mechanism. A main or display web 2 is wound on a pair of reels 3 and 4. The reels 3 and 4 are carried on shafts 5 and 6, respectively, which shafts are journalled in posts 7 attached to the base 1.

Figure 1:
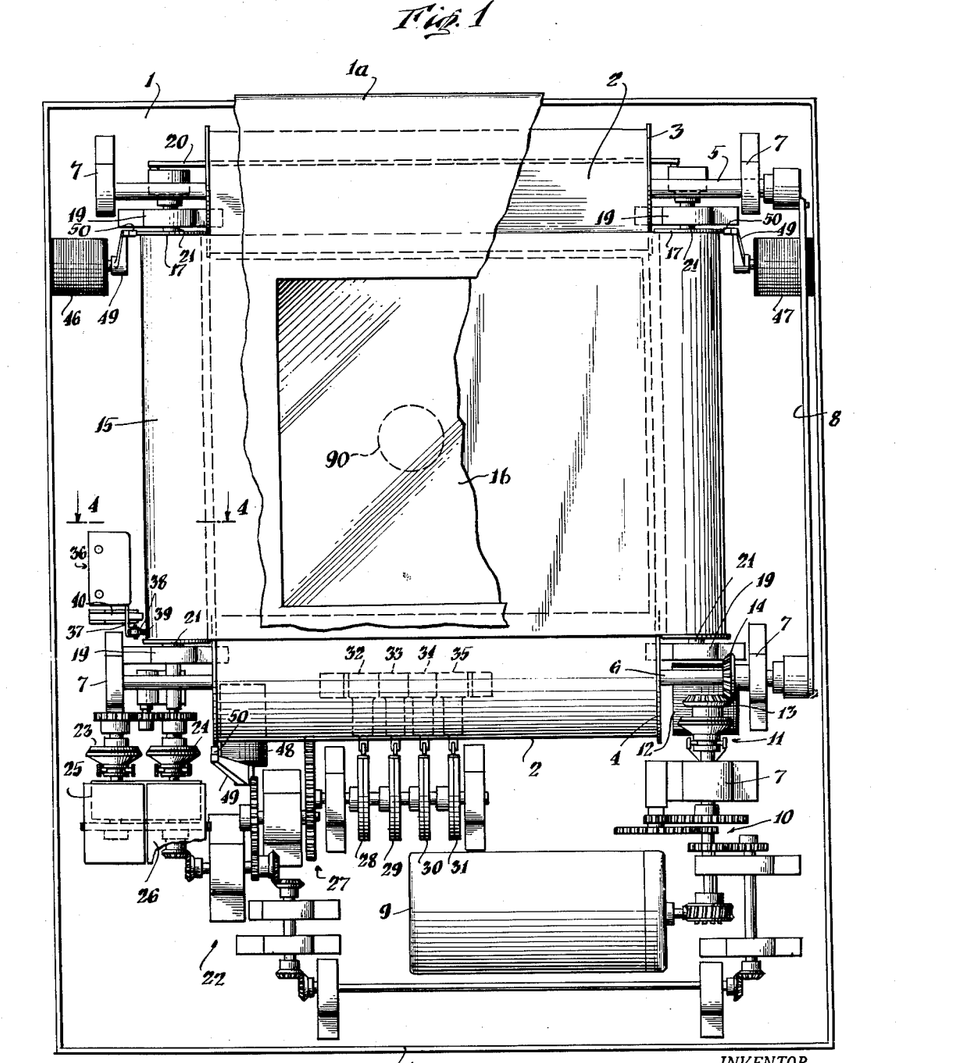
Fig. 1 is an elevational view, partly in section, of a changeable display mechanism embodying the invention. Certain parts have been omitted from this figure and others broken away for purposes of clarity.

Shafts 5 and 6 are connected by an eccentric link 8 attached to their right ends as they appear in Fig. 1, so that both shafts turn concurrently.

A motor 9, which may have a flywheel attached, drives the shaft 6 through a gear train generally indicated at 10 and a clutch 11 operated by a solenoid 12. When engaged the clutch 11 drives a bevel gear 13 which mates with another bevel gear 14 fixed on the shaft 6.

When the device is in operation the motor 9 runs continuously. Another clutch (not shown in Fig. 1— see clutch 77 of Fig. 12), connected to the motor through another branch of the gear train, is provided for driving the shaft 6 in the reverse direction.

Figures 2, 3, 4, 7:
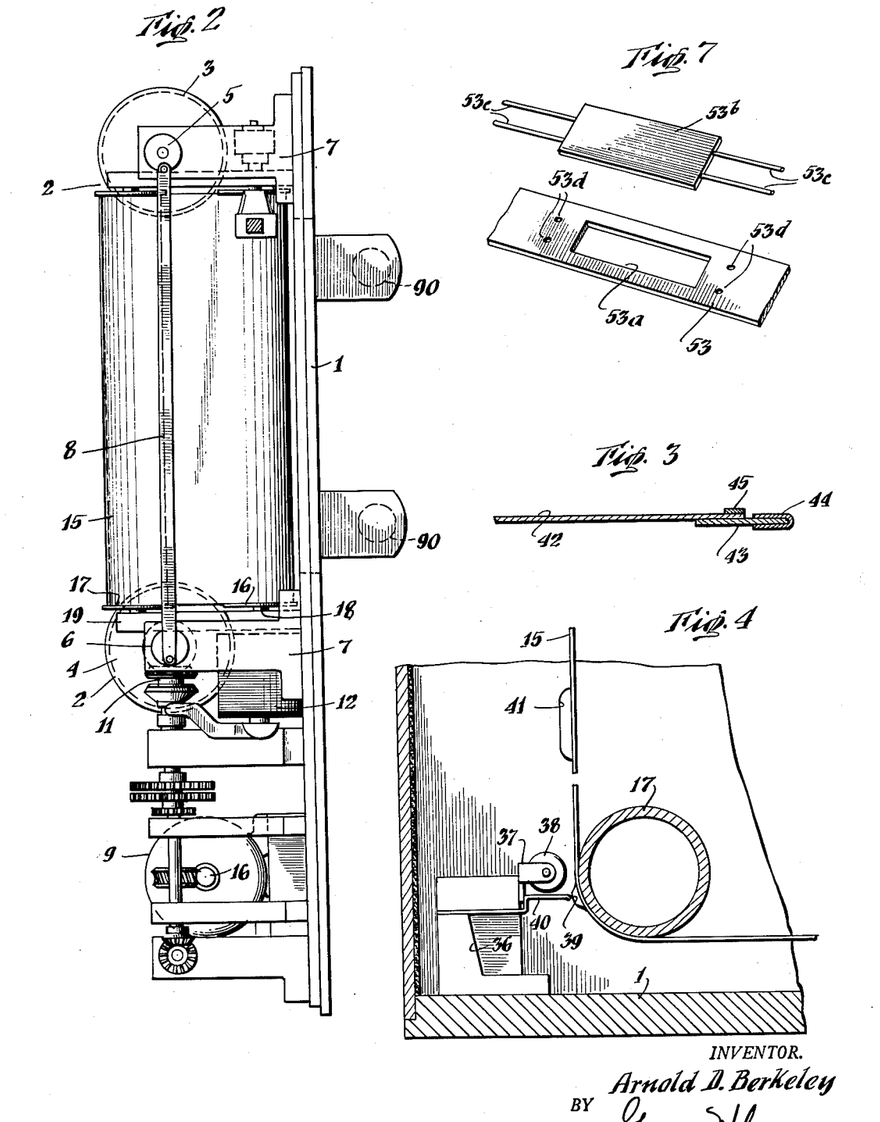
Fig. 2 is a right side elevational view of the mechanism shown in Fig. 1.
Fig. 3 is a detail view showing one form of construction of a display web.
Fig. 4 is a detail view showing a web operated switch and a mounting therefor.
Fig. 7 is an exploded perspective view of an alternative form of web-operated control apparatus.

A screen web 15 is wound on a pair of reels 16, one of which appears in Fig. 2, and passes over a pair of idle rollers 17 and over the web 2. The reels 16 are supported on shafts 18, which are journalled in posts 19 mounted on the base 1. The upper ends of the shafts 18 are connected by an eccentric link 20 so that the two shafts 18 rotate together. The idle rollers 17 are journalled on shafts 21 which are also journalled on the posts 19.

The motor 9 drives the reels 16 and the shafts 18 through a gear train generally indicated at 22, and clutches 23 and 24 operated respectively by solenoids or electromagnets 25 and 26.

The clutches, such as those shown at 11, 23 and 24 are of the non-slipping, positive action type. It is preferred to use a clutch having one face lined with a tough, resilient material, such as hard rubber, and having a fine-toothed gear on the opposite face. This type of clutch is used because it is desired to start the webs moving as rapidly as possible, without the relatively long periods of acceleration characteristic of a friction clutch.

The motor 9 also drives, through the gear train 22 and another gear train 27, a set of timer cams 28, 29, 30 and 31. These cams operate switches 32, 33, 34 and 35, which cooperate in the control of the display mechanism in a manner to be described hereinafter.

There are also provided a number of web operated switches, one of which is shown at 36 in Fig. 1. These switches and the cam-operated switches may be any of the common small unitary snap action switches such as those commonly sold under the name "Micro-Switch." The switch 36 is operated by movement of a spring finger 37 carrying a roller 38 at its outer end, which roller projects into the path of a lug 39 carried by the web 15. When the lug 39 engages the roller 38, the latter is moved toward the left as viewed in Fig. 1 against the bias of the spring 37. A spring detent 40 is provided adjacent the finger 37, so that when the finger 37 is pushed back by the lug 39, the detent 40 snaps in behind it and holds it in its inward position. The end of the detent 40 projects into the path of another lug 41 on the web 15. When the lug 41 engages the end of the detent, the detent is forced downwardly, moving its bent up end out from behind the finger 37 and allowing the latter to move to its normal position. In the normal operation of the apparatus, the lug 39 is attached to one end of the web 15 and the lug 41 is attached to the opposite end. It may then be seen that the switch 36 is operated to one circuit controlling position at one end of the travel of the web 15, where it remains until it is moved to its opposite circuit controlling position at the other end of the travel of web 15.

The web 2 may be constructed as shown in Fig. 3. The main body of the web is shown at 42, and may be any suitable flexible fabric or plastic material. This web 42 is stretched on a frame 43, formed of steel tapes. In the portion of the web between the reels 3 and 4, the outer edges of the steel tapes 43 run in guides 44 so that the web is maintained flat. A strip of silk ribbon 45 is attached to the outer edge body of the web 42. This strip serves to separate the sheets of the web when the web is wound on the reels, and prevents wearing of the web due to slipping of the web sheets over one another when so wound. Other materials than silk may be used, and the strip need not be continuous. For example, spaced rubber pads would be suitable.

Braking apparatus is provided for slowing the movements of the webs and reels as they reach the positions wherein certain desired portions of the web are in register with the window in the casing of the apparatus. As shown in Figs. 1 and 2 this braking apparatus includes two solenoid operated brakes 46 and 47 for the screen web 15 and one solenoid operated brake 48 for the display web 2. The solenoids 46, 47 and 48 operate brake arms 49 which carry at their outer ends brake shoes 50 which cooperate with the outer rims of the flanges on the respective reels, and which have their active faces lined with fiber or other suitable friction material. In the braking apparatus shown, the brakes are spring loaded to their braking positions, and are released when the solenoids are energized. Other mechanically equivalent brake mechanisms may of course be used. It may be desirable to operate each set of brakes with one solenoid. As another alternative, it may be convenient to combine the clutch and brake mechanisms into one unit.

A casing 1a is mounted on the base 1 and has a window 1b aligned with the portions of the webs which are stretched out between the reels.

Another form of driving mechanism includes one clutch for each reel, arranged to drive that reel in the loading direction only. The reel being unloaded is then driven only by the moving web.

Figure 5:
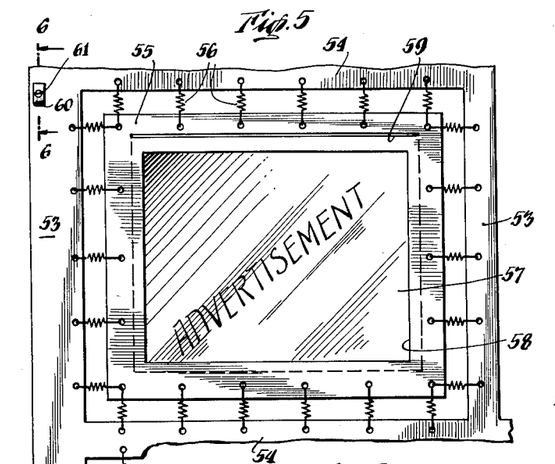
Fig. 5 is a detail view showing a modified form of construction of the display web.

Fig. 5 illustrates the details of construction of one form of display web 2. As there shown, the web 2 is formed from two elongated steel tapes 53, connected by steel band cross bars 54. The tapes 53 form a succession of frames with the cross bars 54. In each of the frames is mounted an envelope 55 of fabric or plastic material. Rubberized glass cloth is suitable. In Fig. 5, the envelope 55 is illustrated as being yieldably attached to the steel framework by a series of flat springs 56. The envelope 55 is provided with transparent panels 57 in its sides, through which can be seen a display card 58 inserted in the envelope through a slot 59. If required, any suitable means may be provided for closing the slot 59, as for example, a zipper or a flexible strip which interlocks with both edges of the flap. The springs 56 should be constructed so that they will not twist or buckle. This prevents fouling of springs in adjacent layers of the web when wound on the reels. It is possible to space the springs along the web so that the springs on adjacent layers on the reels are spaced from each other.

It may be seen that this structure prevents the transmission of any strain to the display member during the sudden accelerations and decelerations required of the webs during operation of the changeable display device, as explained hereinafter.

Lamps 90 are mounted behind the window 1b in the base 1, and are lighted whenever the display device is in use. The display cards 58 are transparent or translucent and hence are distinctly visible from outside the window 1b whenever they are aligned with the window and are covered by one of the transparent screen web panels 67 or 68.

Figure 6:
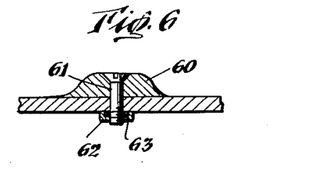
Fig. 6 is a sectional view on an enlarged scale taken along the line 6—6 of Fig. 5, looking in the direction of the arrows.

There is illustrated in Figs. 5 and 6 a switch operating lug 60 and one method of attaching it to one of the steel bands 54. As shown, the lug 60 is attached by means of a bolt 61 and a nut 62 having an elastic insert 63 to hold it locked in place. Many other forms of snapping or locking fasteners are suitable for this purpose and may alternatively be used.

Fig. 7 shows an alternative form of web construction for operating a switch in accordance with the web position. In Fig. 7, the steel tape 53 is provided with an aperture 53a to receive a spring-pressed switch operating button (not shown) as the web passes it. The switch button normally rides on the web. When it is desired to have the aperture 53a pass the switch button without operating the switch, then the aperture may be closed by means of a plate or lug 53b. The lug 53b is provided with wires 53c which may be threaded through holes 53d in the tape to attach the lug thereto.

Figure 8:
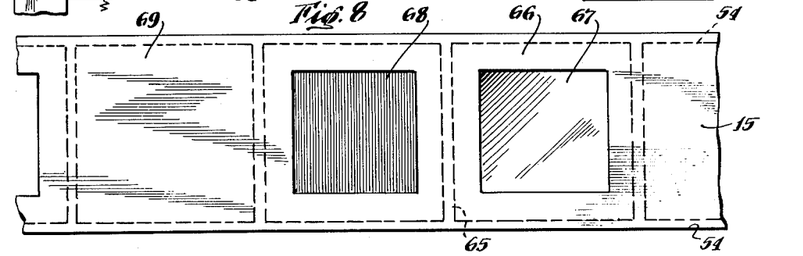
Fig. 8 is a detail view illustrating the construction of the screen web.

Fig. 8 illustrates one form of screen web, which may perform the function of the screen web 15 in Fig. 1. The web 15 of Fig. 8 is formed of two elongated steel tapes 54 and steel cross bands 65. A suitable opaque fabric or plastic body 66 is attached to the steel tapes 64 and bands 65 by cementing or other suitable means. The opaque body 66 has transparent inserts 67 and 68, through which the display web may be viewed. The insert 67 is clear while the insert 68 is tinted red as indicated by the vertical lines in the drawing. Of course, any other desired color or combination of colors could be used. The insert 67 may be omitted, if desired, leaving a hole. The sequence of the colored, transparent and opaque panels may be varied as desired. At the left and right of the transparent inserts 67 and 68, the opaque body 66 extends completely across the frame formed by the steel tapes and bands, as shown at 69 in the drawing. These portions 69 of the screen web 15 are positioned in front of the display web during the time that the latter is being shifted from one position to another.

Figure 9:
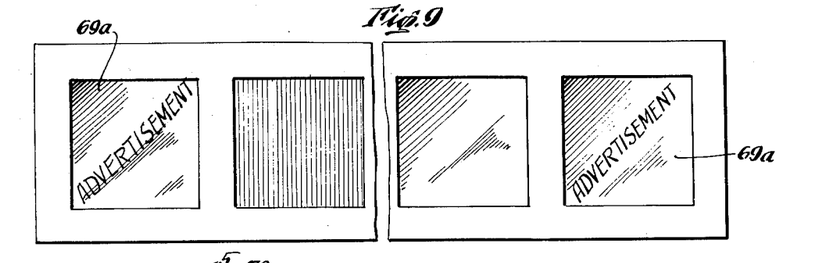
Fig. 9 is another detail view illustrating certain other features of the screen web construction.

Fig. 9 illustrates the end panels of the screen web 15. As there shown, the end panels 69a are opaque, and carry advertisements. These advertisements may be illuminated by lamps 107 (Fig. 10) which are lighted when either advertisement is in view through the window 1b.

Figure 11:
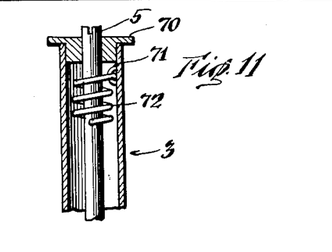
Fig. 11 is a sectional view taken along the axis of one of the reels illustrating the spring mechanism which maintains the web under tension.

Fig. 11 illustrates the internal construction of the reel 3, which is typical of the internal construction of all the reels. As shown in Fig. 11, the reel 3 comprises a hollow cylinder journalled on the shaft 5 by means of end member 70. An eye 71 is attached to the inside of the hollow reel 3 near its end. A coil spring 72 has one end hooked to the eye 71 and has its opposite end attached to the shaft 5. There results a resilient connection between the shaft 5 and the reel 3. When the web is moving, the spring 72 is always maintained under tension tending to stretch the web. In some embodiments of the invention, the spring mounting of the reels may be unnecessary and may accordingly be omitted.

Other spring arrangements may be used to take up the slack and perform the other functions of the internal springs 72. For example, springs may be placed between the end of the web and the reels, either in addition to or in place of the internal springs. Idle rollers running on spring loaded shafts may be used.

When rubber pads are used on the steel tapes to cushion the layers of tape on the roll, these pads serve as additional springs and coact with the internal springs 72 in absorbing shocks and taking up slack.

Figure 12:
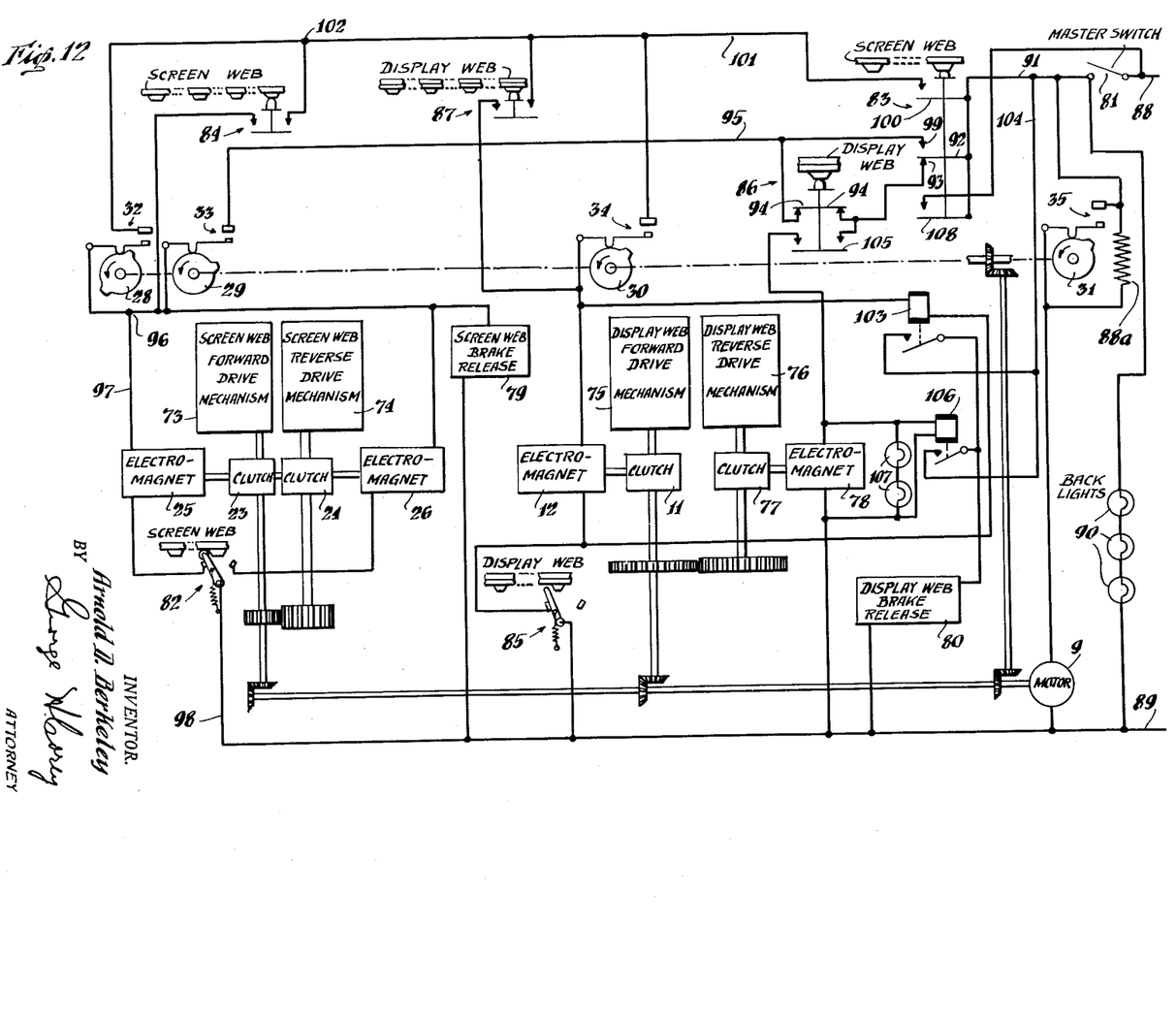
Fig. 12 is an electric wiring diagram of a control system for the display mechanism of Fig. 1.

*Fig. 12*

This figure illustrates diagrammatically the driving mechanism for the display web and the screen web, together with the electrical control circuit for the driving mechanism. Those elements in Fig. 12 which also appear in the structural Figs. 1 and 2 have been given the same reference characters. There are shown diagrammatically in Fig. 12 certain more or less conventional structural elements which were omitted from Figs. 1 and 2 for the sake of clarity.

In Fig. 12, the motor 9 is connected through clutch 23 to a screen web forward drive mechanism schematically indicated at 73. Similarly, the motor 9 is connected through clutch 24 to a reverse screen web drive mechanism 74. Motor 9 is connected through the clutch 11 to a display web forward drive mechanism 75, and drives a reverse display web drive mechanism 76 through a clutch 77. The clutches 23, 24, 11 and 77 are biased to normally disengage the motor from their associated drive mechanisms. The clutches are respectively actuated to connect the motor with the drive mechanisms by means of electromagnets or solenoids 25, 26, 12 and 78.

The screen web brake release illustrated diagrammatically at 79 corresponds to both the brake releasing solenoids 46 and 47 of Fig. 1. The display web brake release 80 corresponds to the brake releasing solenoid 48 of Fig. 1.

The several elements of the driving mechanism are controlled by a master switch 81 which may be manually operated, a number of web actuated switches, of which the switch 36 of Fig. 1 (designated as switch 82 in Fig. 12) is typical, and the switches 32, 33, 34 and 35 actuated by cams 28, 29, 30 and 31, respectively, which cams are continuously driven by the motor 9.

Where the screen web is illustrated diagrammatically in Fig. 12, it is indicated as a single ply web. The display web, on the other hand, is indicated as a two-ply web. This difference in representation is made only for purposes of clarifying the drawing so that the eye can quickly determine which web operates a given switch, and does not indicate any actual structural difference between the two webs.

The screen web is provided with lugs for the operation of three switches, namely a toggle type limit switch 82, a spring return type limit switch 83 and a spring return interrupter switch 84. The limit switch 82 corresponds in function to the switch 36 of Fig. 1. It is a double throw switch of the snap action type, which remains in either position to which it is actuated until it is positively actuated in the opposite direction. This switch is actuated each time the screen web reaches either of its limits of travel. It then remains in the same position until the screen web reaches its opposite limit of travel. Its function is to select the direction of movement of the screen web. The spring return limit switch 83 is spring biased to a normal position opposite to that shown in the drawing. It is moved from the normal position to the actuated position shown in the drawing whenever the screen web is at one of its limiting positions. Its function is to interrupt the movement of the screen web and to reverse the display web and cause it to be rewound so that it can start through a new cycle of displays.

The interrupter switch 84 is spring biased to closed position, but is opened by the screen web each time when a selected portion of that web is aligned with the display window in a position so that the web is ready to be stopped.

The display web also actuates three switches, namely a toggle type limit switch 85, a spring return limit switch 86 and an interrupter switch 87. The switch 85 is structurally similar to the limit switch 82 operated by the screen web, and is actuated from one of its positions to the other each time that the display web reaches either limit of its travel. The switch 86 is spring biased to a position opposite to that shown in the drawing and is moved away from that position to the position shown only when the display web is in its initial position ready to start a display cycle. The interrupter switch 87 is spring biased to closed position and is opened by the display web when any of the several displays on the web are properly aligned with the display window.

Operation

The operation of the mechanism so far described will now be briefly set forth. It is assumed that the various parts are in the positions indicated in Fig. 12, with the display web in its initial position, ready to start a series of displays, and the screen web in one of its ends positions. The master switch 81 is open so that all the circuits are deenergized and no action takes place.

Under these conditions, if it is desired to start the series of displays, the switch 81 is closed. This completes an energizing circuit for the motor 9, which may be traced from the power supply line 88 through switch 81, resistance 88a and thence through motor 9 to the opposite power supply line 89. Motor 9 starts to run and continues to run as long as the main switch 81 remains closed. An obvious circuit is completed at the same time for energizing lights 90.

Only the circuits for motor 9 and lamps 90 are completed when the master switch 81 is first closed. As the motor 9 continues to operate, the cams rotate. When the cam 29 next closes switch 33, a circuit is completed for energizing clutch electromagnet 25 and brake releasing electromagnet 79. This circuit may be traced from power supply line 88 through switch 81, wire 91, contacts 92, 93 of switch 83, contact 94 of switch 86, wire 95, switch 33, junction 96, wire 97, electromagnet 25, switch 82 and wire 98 back to the opposite power supply line 89. Electromagnet 79 is in parallel with the series branch which includes electromagnet 25 and switch 82. Energization of electromagnet 25 through this circuit causes clutch 23 to engage and the screen web is driven forward. The forward movement of the screen web causes switch 83 to return to its normal position, thereby interrupting the circuit just traced for the electromagnet 25, but substituting a new circuit through contacts 92, 99 of switch 83. The movement of the screen web also closes switch 84, establishing a new circuit for electromagnet 25 which is independent of the cam operated switch 33. This circuit may be traced from power supply line 88 through switch 81, contact 100 of switch 83, conductor 101, junction 102, switch 84 and junction 96 to electromagnet 25 and thence to the opposite power supply line 89. This circuit remains completed until the screen web is advanced far enough to make the first display on the display web visible through one of the transparent portions of the screen web. As that position of the screen web is reached, a suitable lug on the screen web operates switch 84 to open position, thereby deenergizing the electromagnet 25 so as to stop the forward movement of the screen web. At the same time, the brake release solenoid 79 is deenergized so as to make the termination of the screen web movement more positive. The screen web then remains in the position where the display web is visible through the translucent portion 67 of the screen web for a length of time determined by the contour of cams 28 and 29. If the cams are contoured as shown in the drawing, and are driven by the motor at a rate of speed such that they complete a full revolution every 15 seconds, then the cam 28 will close the switch 32 after substantially half that period has elapsed. Switch 32 is connected between the junctions 96 and 102 in parallel with switch 84. Closure of switch 32 therefore energizes the electromagnet 25, engaging clutch 23 to start the screen web moving forward again. This forward motion continues until the next lug on the screen web opens switch 84, which occurs when the colored translucent panel 68 on the screen web is aligned with the display window. The motor and the clutches are preferably so designed that this forward movement of the screen web takes place in a fraction of a second, although a slower movement could readily be used if desired. The switch 84 and the lugs which operate it may be designed as required to interrupt the energization of the clutch and brake electromagnets so as to stop the screen web at the desired positions. If necessary, the switch 84 may be opened while the web is a predetermined distance away from the desired position, as required by the inertia of the moving parts and the characteristics of the brake mechanism.

Opening of switch 84 disengages the clutch between the motor and the reels and also applies the brakes to the rims of the flanges on the reels. The brakes must overcome the inertia of the reels and web, but since the reels are resiliently connected to their driving shafts through springs 72, the shafts and the moving parts between the shafts and the clutch need not be stopped in order to stop the web and reels. Those parts can continue to move after the web is stopped, their inertia being expended in the springs 72. The springs 72 therefore aid in the accurate positioning of the web as it stops, in addition to their function of minimizing the transmission of shocks to the web during the sudden stops and starts.

After the translucent panel 68 has been moved in front of the display web, it remains there until the came 28 again momentarily closes the contact 32, which starts the screen web moving again to bring the opaque panel 69 in front of the display window.

As soon as the opaque panel has been brought into alignment with the display window, cam 30 closes switch 34 to complete the energizing circuit for the electromagnet 12 so as to drive the display web forward and bring a new display into alignment with the window. This circuit may be traced through switch 81, contact 100 of switch 83, conductor 101, switch 34, electromagnet 12 and switch 85 to the opposite power supply line 89. Switch 34 is only momentarily closed by cam 30, but as soon as the display web 2 starts to move, switch 87 closes its contacts in parallel with those of switch 34, so that the motion of the display web continues until switch 87 is again opened by a lug on the display web. This lug is attached to the display web so as to open the circuit to electromagnet 12 at the proper time to stop the web with the new display in alignment with the window.

A relay 103 has its winding connected in parallel with the electromagnet 12. The relay 103 operates a front contact connected in an energizing circuit for the display web brake release electromagnet 80. This circuit may be traced from power supply line 88 through switch 81, a conductor 104, the contact controlled by relay 103 and thence through the winding of the display web brake release 80 to the power supply line 89. It may be seen therefore that the brake release 80 is energized substantially simultaneously with the electromagnet 12. The clutches and brakes in the display web drive mechanism act in substantially the same way as the corresponding parts of the screen web drive mechanism.

After the display web has been moved to its new position, the cam 29 momentarily closes contact 33 to initiate a new cycle of movements of the screen web 15 which new cycle may include the interposition in sequence of a transparent panel 67 and a colored transparent panel 68 between the second display and the window, after which an opaque portion of the screen web will be moved in front of the display and the display web will then be moved forward as before.

This cycle of operations continues until the display web and the screen web both reach the end of their travel. The display web reaches the end of its travel first, with the screen web continuing to move through one of its cycles in which the last display on the display web is successively viewed through clear and colored transparencies.

When the display web reaches the end of its travel, the switch 85 is operated to the position opposite that shown in the drawing, thereby opening the switch so that electromagnet 12 cannot be again energized to drive the display web forward. When the screen web reaches the end of its travel, the switch 83 is operated to the position shown in the drawing, thereby opening at its contacts 100 and 99 the energizing circuits for electromagnet 25 previously traced. At the same time, switch 82 is reversed, so that the next completion of any of the circuits through contacts 99 and 100 will cause energization of the reverse drive electromagnet 26 rather than the forward drive electromagnet 25.

Switch 86 is now in the position opposite to that shown in the drawing, so that contact 94 is open and no circuit for the screen web drive electromagnets can be completed through it. However, a circuit for the electromagnet 78 is now completed. This circuit may be traced from power supply line 88 through switch 81, wire 91, contacts 92, 93 of switch 83, contact 105 of switch 86 and thence through electromagnet 78 to the power supply line 89. Energization of electromagnet 78 causes clutch 77 to engage, driving the display web in reverse so as to rewind it on the reel where it was initially found.

Figure 10:
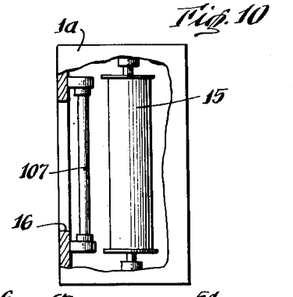
Fig. 10 is another detail view showing certain features which cooperate with the structures of Fig. 9.

Connected in parallel with the winding of electromagnet 78 is a relay 106 having a front contact connected in parallel with the front contact of relay 103, so that the display web brake release electromagnet 80 is energized concurrently with the electromagnet 78. A set of lights 107 which are arranged to illuminate the screen web 15 from the front are connected in parallel with the electromagnet 78. Since the end portions of the screen web are in view for a substantial period of time during which the display web is being rewound, it is desirable to provide a display on the outside of the opaque portions at the ends of the screen web, as shown in Figs. 9 and 10. The lights 107 serve to illuminate those displays during rewinding of the display web.

When the display web reaches its initial position, the switch 86 is operated to the position illustrated in the drawing. All the parts are now restored to their initial positions, except that the screen web is at the opposite end of its travel and the switch 82 is reversed. A new cycle will now start, which will be the same as the cycle just described except that the screen web will move in the reverse direction during the new cycle. The cycles will continue successively until such time as the main switch 81 is opened. If that switch is opened in the middle of a cycle, while the screen web is between its end positions, then the main switch 81 will be shunted by contact 108 of switch 83, and the mechanism will complete the cycle then occurring before the power supply is cut off.

It may be desirable under some conditions to change the speed of the motor during certain of the screen web movements. This may be done, for example, by shunting the resistance 88a with the switch 35 operated by cam 31. It will be understood that the motor 9 will run faster when the resistance 88a is shunted out of the circuit. The cam 31 may be suitably contoured to give the required speeds at the times desired. It should be understood that other common speed changing mechanisms could be employed in carrying out my invention. The resistance shunting mechanism shown here is set forth only by way of example.

The cross bars 54 on either of the webs may be made removable, so that a display longer than the standard frame size could be employed. Where that is done, the web may be made to move the long display slowly across the window, by suitable speed control means as mentioned above to provide a "moving message" type of display. The web speed may then be selected by suitable lugs on the web, such as those described hereinafter in connection with Figs. 17 to 19.

As shown in Fig. 12, the cam 31 is contoured so that switch 35 is closed concurrently with the second closure of switch 32 during each individual display. This second closure of switch 32 is the one which causes the opaque portion of the screen to move in front of the display. The use of a high motor speed at this time results in a sudden disappearance of the display from the observer, without his being aware of the cause of the disappearance.

If desired, the cam 31 may be contoured so as to produce a high speed movement of the screen web when the display is first brought into view. Different speeds may be used for other movements of either web as required.

By means of the present invention, it is possible to change the number of displays in each cycle of operation of the machine without changing the length of the display web. The lugs, such as lug 60 in Figs. 5 and 6, which cause operation of the limit switches at the ends of the web travel, may be detached from the web and attached at a different point. If the web is 20 frames long and it is desired to use only 16 displays, then the lugs for operating the limit switches may be attached at the sixteenth frame so that the web is reversed after the sixteenth display. Similar changes may be made in the limit switch operating structure of the screen web. It should be apparent that by virtue of this arrangement, the mechanism is made very flexible with respect to the number of displays which are in use at any given time. As described in connection with Fig. 5, the individual displays are removable so that any one may be changed without disturbing the others.

In the arrangement just described, the starting of the webs is controlled by the timer, while the stopping of the webs is controlled by switches operated by lugs attached to the webs. An alternative arrangement would be to control both the starting and stopping of the webs by the timer. This alternative might not provide as accurate alignment of the displays with the window as does the web-operated control, but it might be practical, especially if the displays were constructed so as to be effective when stopped at any position within a reasonably wide range.

Other sequences of operation than that described may be employed. For example, the display web may be given a step-by-step movement in its reverse direction as well as in its forward direction.

Figures 13 and 14

Figure 13:
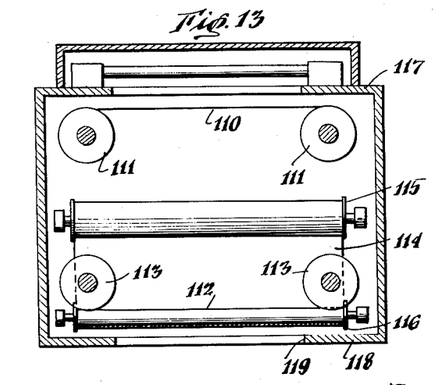
Fig. 13 is a plan view, partly in section, of a modified form of display mechanism in which provision is made for a three-dimensional effect.
Figure 14:
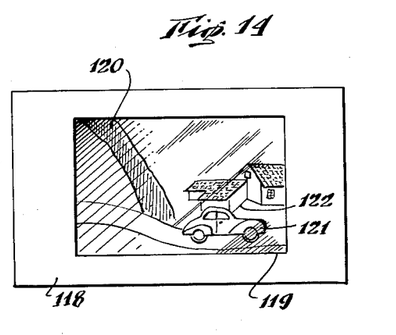
Fig. 14 is an elevational view of the mechanism illustrated in Fig. 13.

These figures illustrate a modified form of display mechanism constructed in accordance with the present invention, in which provision is made for producing a three-dimensional effect.

This apparatus includes a back display web 110 mounted on a pair of reels 111, and a front display web 112 mounted on a pair of reels 113. A screen web 114 is mounted on a pair of reels, one of which is shown at 115, and passes over a pair of idler rollers, one of which is shown at 116. These three webs and their reels are mounted by means not completely shown on a base 117 and enclosed by a cover 118. The cover 118 is provided with a window 119 through which the portions of the webs aligned with the window may be viewed from outside the casing. The interaction of the front display web 112 and the screen web 114 is the same as in the case of the display web 2 and the screen web 15 of Fig. 1. The display portions of the web 112 are partly transparent, however, so that those portions of the back web 110 which are aligned with the front web 112 and the window 119 may be viewed. The displays of these two aligned portions of the display web are prepared in such a manner as to give the illusion of depth to an observer. For example, this may be done by making an object, such as the hillside indicated at 120 in Fig. 14 slightly larger on the back web than it is on the front web. Another way to give an illusion of depth is to place one object such as the automobile 121 of Fig. 14 on the front web in alignment with a differently shaped object such as the building 122 on the back web. In using the apparatus of Figs. 13 and 14, a control system such as that shown in Fig. 12 may be used, so that the front and back webs always move together. Alternatively, it may be desired to have one of the webs moving at a time when both are visible through the screen web, so as to give animation to the display.

It should be noted that the front web 112 is fed across the window from the points on the reels nearest the window. Similarly, the back web 110 is fed across the casing from the points on the reels nearest the back of the casing. This arrangement provides a maximum distance between the webs for a given depth of the casing, and hence gives a maximum three-dimensional effect.

Figure 15:
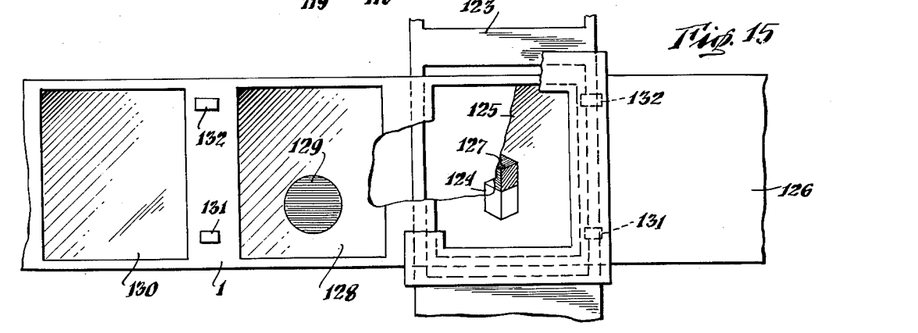
Fig. 15 is an elevational view of a modified form of screen web which may be used in the display mechanism of Fig. 1.
Figure 16:
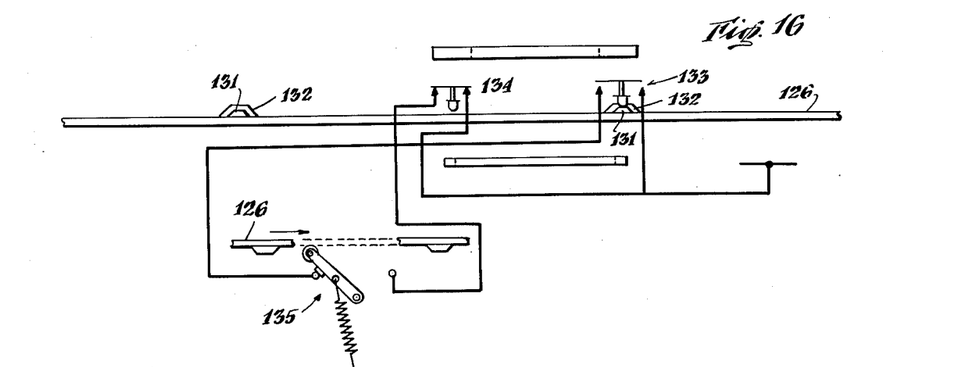
Fig. 16 is a view, partly in plan and partly diagrammatic, illustrating the modified screen of Fig. 15 and certain modifications of the control circuits used when the screen of Fig. 15 is employed.

*Figs. 15 and 16*

These figures illustrate a modified form of web construction and control mechanism for use therewith, in which part of the display is printed on the transparent portions of the screen web so that an observer sees a composite display consisting of some elements on the screen web and others on the display web.

It will be readily understood that this arrangement is mechanically simple insofar as the individual display structures are concerned. However, if a control system such as that previously described in connection with Fig. 12 is to be employed, wherein the screen web moves in one direction during a first cycle of displays and then in the opposite direction during the next succeeding cycle of displays, then modifications of the screen web structure and its control system must be made in order to insure that portions of the two webs carrying cooperating displays are correctly aligned.

The screen web is provided with two sets of transparencies for each composite display. One transparency is aligned with the display web in the proper sequence when the screen web is moving in one direction, and the other transparency of the set is aligned with the display web in proper sequence when the screen web is moving in the opposite direction. When the screen web is moving in the wrong direction to bring a given transparency into alignment with the display web in the proper sequence, then the control mechanism causes the screen web to continue moving, so that the transparency in question is not stopped in alignment with the window.

In Fig. 15 there is illustrated a portion of a display web 123 which includes a simple cube 124 as part of the display. There is shown aligned with the display web 123 a transparent panel 125 of the screen web 126. The panel 125 has a second cube 127 printed or otherwise impressed on it so that when the panel 125 is in proper registry with the display web 123, then cube 127 appears to be resting on the top of cube 124. The panel 128 just to the left of 125 carries a ball 129, which does not cooperate in any way with the cube 124. Hence, when cube 124 is stopped under the window, the control mechanism causes the panel 128 to pass by the window without stopping. Just to the left of 128 is a transparent panel 130 on the screen web. When the panel 130 is in alignment with the display web panel containing the cube 124, then that cube appears alone in the display, without the cube 127 on top of it. The parts are shown in the drawing as they appear during the sequence when the screen web is moving from left to right.

When the screen web 126 is moving from right to left, the panel of the display web carrying the cube 124 will not be aligned with the window at the time when the panels 128 and 125 pass. Some other display (not shown) will then be aligned with the window, having certain display elements which cooperate with the colored disk 129, but which do not cooperate with the cube 127. During that phase of the operation, it is desirable to stop the screen web when each of the panels 130 and 128 are aligned with the display web, but to permit the panel 125 to pass by without stopping.

In order to obtain this slective stopping action on the screen web, two sets of lugs are attached to that web, as shown at 131 and 132. The lugs 131 cooperate with a switch 133 so as to open that switch whenever the panel to the left of the lug is aligned with the window. The lugs 132 cooperate with a switch 134 so as to open that switch whenever the panel to the right of the lug is aligned with the window. The particular spatial relationship of each set of lugs and the panels it is to stop in front of the window depends only upon the positions of the switches 133 and 134. The arrangement shown is chosen only for convenience of illustration.

The switches 133 and 134 function as interrupter switches, similar to the switch 84 of Fig. 7. Only one of the switches 133 and 134 is effective to interrupt movement of the screen web at any given time. The particular one of those switches which is effective to stop the movement of the screen web is determined by a toggle type limit switch 135, whose position is determined by the direction of movement of the screen web. Structurally, the switch 135 is similar to the switch 82 of Fig. 12.

Although the lugs 131 are shown as smaller than lugs 132, this is done only to permit clear illustration of both lugs in Fig. 16, and does not indicate any structural difference in the two sets of lugs.

When the parts are in the positions shown in the drawing, the screen web 125 is moving from left to right, and the position of the toggle switch is such that the interrupter switch 133 determines the points at which the screen web is stopped. Hence the web is stopped whenever one of the lugs 131 engages the switch 133. In the position shown, the lug 131 to the right of panel 125 has engaged the switch 132 and stopped the movement of the screen web. When the screen web is next started, it will not stop with the panel 128 aligned with the window because there is no lug 131 to the right of panel 128. It will stop with the panel 130 aligned with the window, since there is a lug 131 to the right of panel 130.

When the web 126 reaches the end of its movement to the right, switch 135 is operated to shift the interrupter control from switch 133 to switch 134. During the subsequent movement of the web 126 to the left, the web will be stopped successively with the panels 130 and 128 aligned with the window, but the panel 125 will be skipped because there is no lug 132 at the left of that panel.

Summarizing, it may be seen that the control mechanism causes the panel 128 to be skipped during movement of the screen web to the right and causes the panel 125 to be skipped during movement of the screen web to the left.

The arrangement just described may be modified by making one of the webs of the composite display move slowly while the other remains fixed, thus providing animation. The slow movement may be selected by the use of suitable lugs on the web.

The sequence of movements just described for the screen web may be employed for the display web, whether or not a screen web is used. When so used for a display web, it would eliminate the necessity of driving the display web continuously for rewinding. It would also preserve the same sequence of displays at all times, which could not be obtained with a display web driven step-by-step in reverse without the skipping control mechanism just described.

Figures 17, 20:
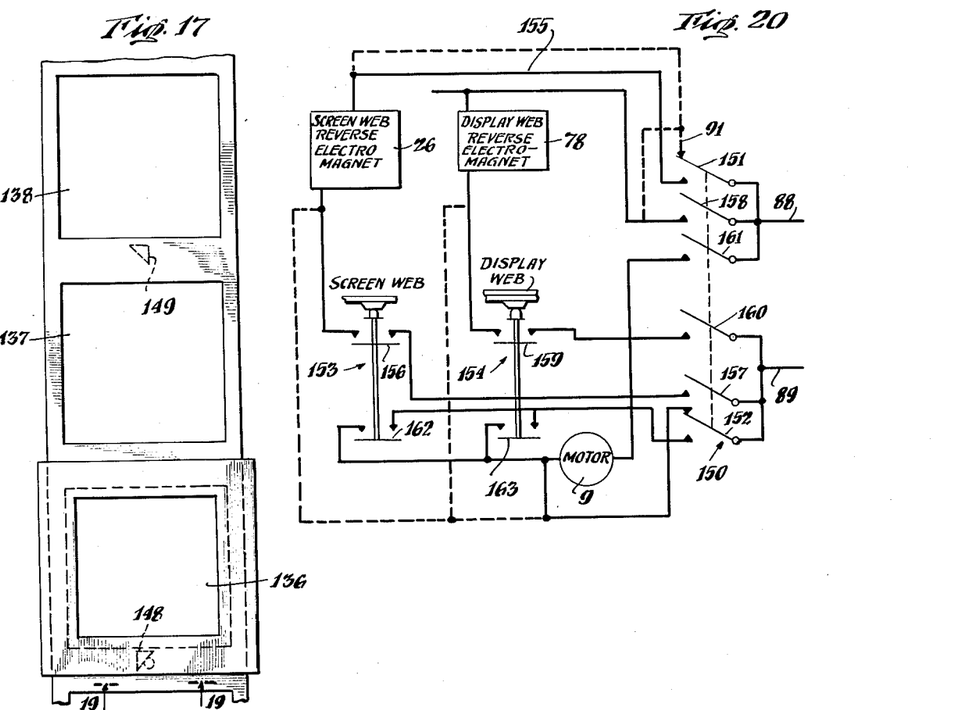
Fig. 17 illustrates a modified form of display web which is used when it is desired to have different displays exhibited for different periods of time.
Fig. 20 illustrates a modified form of control circuit which may be used in place of certain parts of the control system of Fig. 12.
Figures 18, 19:
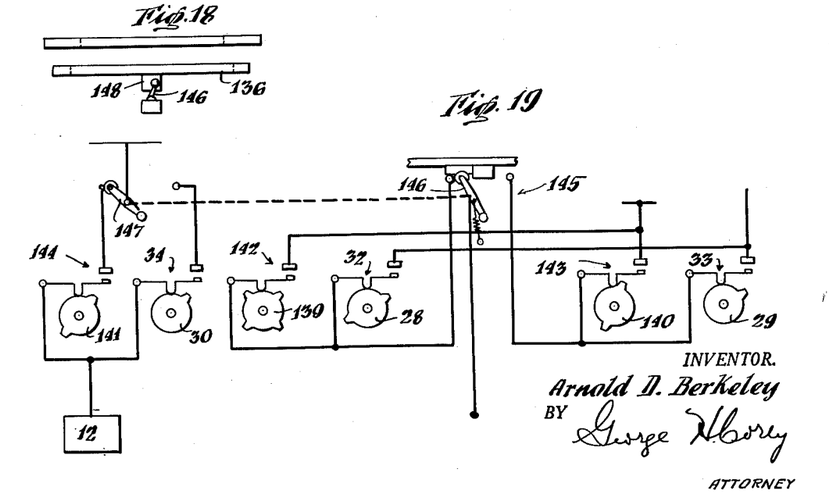
Fig. 18 is a side view of the display web of Fig. 17.
Fig. 19 is a view which is partly diagrammatic and partly in section along the line of 19—19 of Fig. 17, looking in the direction of the arrows.

*Figs. 17 to 19*

There is illustrated in these figures a modified form of display web and control circuit which may be used when it is desired to have different display panels exhibited for different periods of time.

A screen web is omitted from Figs. 17 to 19 for purposes of clarity, only the display web being shown.

There is shown in Fig. 17 a display web including successive displays 136, 137 and 138.

Two sets of timer cams are provided, the set 28, 29 and 30 which are the same as the correspondingly numbered cams in Fig. 12, and the cams 139, 140 and 141 which are similar to the cams 28, 29 and 30, respectively, except that each has twice the number of pips as its counterpart. Since they are indicated as being driven by the same shaft, the cams 139, 140 and 141 will carry their associated switches 142, 143 and 144 through a cycle of operation in one half the time required for the cams 28, 29 and 30 to operate their switches. Only one set of cams is effective to control the movement of the web at any given time. The particular set of cams which is effective is determined by a toggle switch contact 145 having two movable contacts 146 and 147. The toggle switch contact 146 determines the selection of the cams and switches which control the movements of the screen web, whereas the contact 147 determines the selection of the cam and switch which controls the movements of the display web.

The points at which the circuit elements in Fig. 19 are connected in the circuit of Fig. 12 are indicated by the use of identical reference characters for the common circuit elements.

The toggle switch 146 is operated by removable cam lugs 148 and 149, which are attached to the lower surface of the web 136. These lugs 148 and 149 present a diagonal surface to the operating arm of switch 145, and move that arm laterally from one side to the other as the movement of the display web progresses. When the switch 145 is guided to the position shown in the drawing, the cams 139, 140 and 141 control the movements of the webs, so that the displays are each visible for only half the display interval which is effective when the switch 145 is in its opposite position. It is therefore possible to determine the length of time for which any given display is visible by attaching a lug 148 or 149 to the screen web just ahead of the portion of the web which cooperates with that display. The lugs 148 and 149 may be provided with a beveled under surface so that they are ineffective to move the switch 145 during rewinding of the display web.

Figure 20

This figure illustrates a modified form of control circuit which may be used in place of a portion of the circuit shown in Fig. 12. The control structure of Fig. 20 has particular reference to the operation of the display mechanism when it is shut off. As mentioned in connection with Fig. 12 the contact 108 of that structure is effective to maintain the apparatus in operation after the master switch 81 is opened until such time as the screen web reaches one end of its travel. In some instances, that mode of operation may not be desirable. For example, if the apparatus is used in a taxicab to display advertising signs to the occupant of the cab, then it may be desirable to have the apparatus shut off whenever the cab is vacated. Since the complete cycle of operation may last for several minutes, it would be wasteful to have the apparatus continue to run through the rest of its cycle before shutting off. Furthermore, it might be desired to have each new passenger witness the beginning of the display sequence. For such installations, the control system of Fig. 20 may be used. This system is arranged so that when the apparatus is shut down, both the screen and display webs reverse and run continuously until they reach the end of their travel.

Referring now to Fig. 20 there is shown a master switch 150 which replaces the switch 81 of Fig. 1. It is shown in its normal running position, so that power supply line 88 is connected to conductor 91 as is the case when the switch 81 of Fig. 12 is closed. Also one terminal of the motor 9 is connected through a contact 152 to power supply line 89. Those portions of the energizing circuits for the electromagnets and the motor which are shown in detail in Fig. 12 are not repeated in Fig. 20, but are represented therein by dotted lines.

Two additional limit switches are provided in Fig. 20. One limit switch 153 is opened by the screen web at one end only of its travel and the other limit switch 154 is opened by the display web at the initial end only of its travel.

When it is desired to shut the apparatus down, the switch 150 is moved from the position shown in the drawings to its opposite position. An energizing circuit is then completed for the screen web reversing electromagnet 26 which may be traced from power supply line 88 through contact 151 of switch 150, wire 155, electromagnet 26, contact 156 of switch 153 and contact 157 of switch 150 to power supply line 89. This circuit remains completed until the screen web reaches the end of its travel at which switch 153 opens.

At the same time, an energizing circuit is completed for the display web reversing electromagnet 78 which may be traced from power supply line 88 through contact 158 of switch 150, electromagnet 78, contact 159 of switch 154 and contact 160 of switch 150 to power supply line 89. This circuit remains closed until the display web reaches its initial position and opens limit switch 154.

During the time that either of the two circuits just traced is closed, an energizing circuit for the motor 9 is completed from power supply line 88 through contact 161 of switch 150, motor 9, contact 162 of switch 153 in parallel with contact 163 of switch 154 and thence through contact 152 of switch 150 to power supply line 89. This circuit is completed as long as either of the switches 153 and 154 are closed. When both are open, the motor circuit is interrupted and the entire apparatus is deenergized.

When the apparatus is shut down by means of the switch 150, it stops with both webs in a predetermined initial position, ready to start a display cycle as soon as the switch 150 is returned to its "on" position.

I claim:

1. In a display device, a pair of reels, two spaced flexible tapes each wound on said reels and having its ends respectively connected to said reels, resilient pads on said tapes for spacing the web layers on the reels from each other, a plurality of transverse flexible bands extending between said tapes and forming therewith a plurality of frames, a plurality of envelopes separate from said frames, one for each of said frames, means yieldably and permanently connecting the envelopes to the frames, each said envelope having at least one transparent face so that a marked sheet inserted therein is visible through said face, and means for opening and closing said envelopes to change the sheets inserted therein.

2. A display device comprising a casing having a window therein, a pair of reels located in said casing on opposite sides of said window, an elongated flexible web having markings thereon to be viewed through said window, said web being wound on said reels and having its ends respectively connected to said reels, means for driving the web past said window intermittently in either direction, said web having two sets of spaced display portions, and means, including at least one switch operated by movement of the web, for controlling the movements of the web so that the portions of the respective sets pass rapidly by the window when the web is moving in respectively opposite directions.

3. In a display device, a pair of reels, an elongated flexible web wound on the reels and having its ends respectively connected to the reels, resilient pads on said web for spacing the web layers on the reels from each other, and means for applying tension to the web, said tension applying means being effective to compress the pads on the portions of the web wound on the reels and cooperating with said pads to take up slack in the web.

4. In a display device, a pair of reels, an elongated flexible web wound on the reels and having its ends respectively connected to the reels, means for driving the reels, a switch to be operated in accordance with the web position, a switch operating member positioned adjacent the web and biased to engage a portion of the web, said web having at least one aperture in said member-engaging portion to receive said member, said member being effective to operate the switch to one circuit-controlling position when the member is engaged by said web portion and to a different circuit-controlling position when the member is received in said aperture, and means removably attached to the web for closing said aperture so that the switch is operated to said one position when the aperture is aligned with said member.

5. In a display device comprising a casing having a window therein, a first pair of reels located in said casing on opposite sides of said window, a first elongated flexible web having markings thereon to be viewed through said window, said web being wound on said reels and having its ends respectively connected to said reels, a second pair of reels located in said casing on opposite sides of the window, a second elongated flexible web having alternate transparent and opaque portions at least equal in length to said first web, said second web being wound on said second reels and having its ends respectively connected thereto, said second web lying between said first web and said window, means for driving said webs past said window, a timer for intermittently activating said driving means, first switching means for causing said driving means to intermittently move said first web in a single direction of movement upon termination of each intermittent movement of the second web in either of its two directions of movement, second switching means controlled by the arrival of one web at a predetermined end of its travel for causing said driving means to reverse the direction of movement of both webs so that the first web rewinds continuously and the second web rewinds intermittently.

6. A display device as claimed in claim 5, in which said second web and said second pair of reels are mounted and move at right angles to said first web and said first pair of reels, respectively.

7. A display device as claimed in claim 5, in which certain portions of said second web carry markings to be viewed through said window.

8. A display device as claimed in claim 5, in which the two portions of the second web which are respectively aligned with the window at each end of its travel are both opaque, and which includes means for controlling said driving means so as to return said first web to one end of its travel whenever either of said two opaque portions of the second web is aligned with the window.

9. A display device as claimed in claim 5, in which said two opaque portions of the second web carry markings to be viewed through said window.

10. A display device as claimed in claim 5, including means for illuminating the front of said second web, and means for actuating said illuminating means when either of said two opaque portions is aligned with the window.

11. A display device as claimed in claim 5, in which certain of the transparent portions of the second web are colored so that the markings on the first web appear to be differently colored when viewed through said certain transparent portions.

12. A display device as claimed in claim 5, in which certain of the transparent portions of said second web carry markings which combine with the markings of the first web to form a composite display.

13. A display device as claimed in claim 5, in which said first switching means is controlled by synchronized timing means.

14. In a display device comprising a casing having a window therein, a first pair of reels located in said casing on opposite sides of said window, a first elongated flexible web having markings thereon to be viewed through said window, said web being wound on said reels and having its ends respectively connected to said reels, a second pair of reels located in said casing on opposite sides of the window, a second elongated flexible web, having alternate transparent and opaque portions, at least equal in length to said first web, said second web being wound on said second reels and having its ends respectively connected thereto, said second web lying between said first web and said window, means for driving said webs past said window, automatic means for coordinating said driving means so that in one direction of movement both webs move intermittently in successive steps along their entire length while in the opposite direction of movement the first web rewinds continuously and the second web moves intermittently, said automatic means including a timer for causing said driving means to intermittently move one of the two webs, first web controlled switching means to terminate the movement of each web as it arrives at any one of a plurality of predetermined positions and second web controlled switching means to reverse the direction of movement of both webs as one web arrives as a predetermined end of its travel.

15. A display device as claimed in claim 14, in which said movement coordinating means includes means for causing movement of one of said webs while the other is stationary.

16. A display device comprising a casing having a window therein, a pair of reels located in said casing on opposite sides of said window, an elongated flexible web having markings thereon to be viewed through said window, said web being wound on said reels and having its ends respectively connected to said reels, a motor electromagnetic clutching and braking means for initiating and terminating the driving of the web by the motor, a master switch for initiating and terminating operation of said motor, a timer cam driven by said motor for initiating the operation of said electromagnetic means, and web operated switching means for terminating the operation of said electromagnetic means, whenever the web reaches one of a plurality of predetermined positions.

17. A display device comprising a casing having a window therein, a pair of reels located in the casing on opposite sides of the window, an elongated web having spaced displays thereon to be viewed through said window, said web being wound on said reels and having its ends respectively conected to said reels, a motor, means including said motor for driving said reels, in order to move the web past the window, at least two timer elements, means including one of the two timer elements for controlling the driving means to drive the web intermittently so that at each successive stop a different display is aligned with the window, switching means operated by the web for rendering one of such timer elements operative and switch controlling means incorporated in each of the displays for establishing independently for different displays different periods of time during which the respective displays remain aligned with the window.

18. A display device comprising a casing having a window therein, a pair of reels located in the casing on opposite sides of the window, an elongated web having spaced displays thereon to be viewed through said window, said web being wound on said reels and having its ends respectively connected to said reels, a motor, means including said motor for driving said reels to move the web past the window, means for controlling the driving means to drive the web intermittently so that at each sucessive stop a different display is aligned with the window, a master switch for initiating and terminating operation of the display device, two circuit paths for controlling said driving means, a normally open and manually operated switch for closing one of said circuit paths, and a normally closed and web-operated switch for opening the other of said circuit paths upon arrival of the web at either end of its travel so as to insure continued operation of the driving means, upon operation of said master switch to its terminating position, until the web reaches one end of its travel.

19. A display device comprising a casing having a window therein, a pair of reels located in the casing on opposite sides of the window, an elongated web having spaced displays thereon to be viewed through said window, said web being wound on said reels and having its ends respectively conected to said reels, a motor, means including said motor for driving said reels to move the web past the window, manually operated master switch means for controlling the driving means to drive the web intermittently so that at each successive stop a different display is aligned with the window, normally closed switching means effective upon operation of said master switch to its terminating position for controlling the driving means to drive the web continuously until it reaches a predetermined end of its travel, and means carried by the web for operating such normally closed switching means to an open position when the web arrives at that end of its travel so as to insure continuous rewinding of the web to its initial position when the master switch is operated to its terminating position.

20. A display device comprising a casing having a window therein, a pair of reels located in the casing on opposite sides of the window, an elongated web having spaced portions to be viewed through said window, said web being wound on said reels and having its ends respectively connected to said reels, a motor, means including the motor for driving the reels to move the web past the window, said driving means including an electromagnetically controlled clutch and a yieldable connection between the clutch and the reels, means for braking the reels, electrical switching means for substantially simultaneously disengaging the clutch and applying said brake means, and means individual to different displays carried by the web for operating such electrical switching means upon arrival of the web at any one of a plurality of predetermined positions.

21. In a display device, a pair of reels, a motor, a shaft driven by said motor for driving said reels, a yieldable connection between said motor and said shaft, an elongated flexible web wound on the reels and having its ends respectively connected to the reels, resilient pads on said web for spacing the web layers on the reels from each other, and means for driving said web intermittently, said yieldable connection and said resilient pads being effective to absorb shock and take up slack.

22. A display device comprising a casing having a window therein, a first pair of reels located in said casing on opposite sides of said window, a first elongated flexible web having markings thereon to be viewed through said window, said web being wound on said reels and having its ends respectively connected to said reels, a second pair of spaced reels located on opposite sides of the window, a second elongated flexible web having alternate transparent and opaque portions and at least equal in length to said first web, said second web being wound on said second reels and having its ends respectively connected thereto, said second web lying between said first web and said window, means for driving said webs, automatic means for coordinating the movements of the two webs including a timer for causing said driving means to intermittently move said second web, first switching means controlled by movement of said second web for terminating each of its intermittent movements, means for driving said first web intermittently in one direction only upon termination of each such intermittent movement of the said second web, second switching means controlled by this movement of said first web for terminating its own intermittent movements and third switching means controlled by movement of either web towards the end of its travel so that in one direction of movement both webs move intermittently in successive steps along their entire length while in the opposite direction of movement the first web rewinds continuously and the second web moves intermittently.

23. A display device as claimed in claim 22, in which cooperating automatic means are provided for holding the first web stationary when a transparent portion of said second web is aligned with the window, and for enabling intermittent movement of said first web in the one direction to occur only when an opaque portion of the second web is aligned with the window.

24. A display device comprising a casing having a window therein, a pair of reels located in said casing on opposite sides of said window, an elongated flexible web having markings thereon to be viewed through said window, said web being wound on said reels and having its ends respectively connected to said reels, means for driving the web past said window intermittently in either direction, said web having two sets of spaced display portions, each member of each set being provided with means for operating one of a pair of web operated switches upon the arrival of the web at one of a plurality of predetermined positions, said intermittent driving means including a pair of such web operated switches, and means for selecting one of such web operated switches to be effective during movement of the web in a particular direction for controlling the movements of the web so that the portions of the respective sets pass rapidly by the window when the web is moving in respectively opposite directions.

25. A display device comprising a casing having a window therein, a first pair of reels located in said casing on opposite sides of said window, a first elongated flexible web having markings thereon to be viewed through said window, said web being wound on said reels and having its ends respectively connected to said reels, a second pair of spaced reels located on opposite sides of the window, a second elongated flexible web at least equal in length to said first web having spaced, partially transparent portions, said second web being wound on said second reels and having its ends respectively connected thereto, said second web lying between said first web and said window, means for driving said second web past the window intermittently in either direction, said second web having two sets of such partially transparent portions, each member of each set being provided with means for operating one of a pair of web operated switches upon the arrival of the second web at one of a plurality of predetermined positions, said intermittent driving means including a pair of such web operated switches and means for selecting one of such web operated switches to be effective during movement of the second web in a particular direction so that the portions of the respective sets pass rapidly by the window when that web is moving in respectively opposite directions and cooperating automatic means including at least one switch operated by movement of either web for driving said first web past said window intermittently in one direction and continuously in the opposite direction so that the partially transparent portions of either set of display members on the second web pass rapidly by the window when the second web is moving in a direction such that that set does not cooperate with the markings on the first web.

References Cited in the file of this patent

UNITED STATES PATENTS

| | | |
|---|---|---|
| 770,585 | Ikemori | Sept. 20, 1904 |
| 942,021 | Weismann | Nov. 30, 1909 |
| 1,415,712 | Rontey | May 9, 1922 |
| 1,612,850 | Barlow | Jan. 4, 1927 |
| 1,674,565 | Petersen | June 19, 1928 |
| 1,716,575 | Corso | June 11, 1929 |
| 1,740,517 | Margeson | Dec. 24, 1929 |
| 1,821,844 | McGrath | Sept. 1, 1931 |
| 1,890,657 | Stonequist | Dec. 13, 1932 |
| 2,060,437 | Harley | Nov. 10, 1936 |
| 2,102,474 | McKenna | Dec. 14, 1937 |
| 2,119,562 | Taddonio | June 7, 1938 |
| 2,124,698 | Harms | July 26, 1938 |
| 2,192,072 | Fasig | Feb. 27, 1940 |
| 2,510,409 | McPhaul | June 6, 1950 |
| 2,524,216 | Weissman | Oct. 3, 1950 |

FOREIGN PATENTS

| | | |
|---|---|---|
| 33,563 | Austria | July 10, 1908 |
| 408,227 | Great Britain | Apr. 3, 1934 |
| 639,851 | Germany | Dec. 17, 1936 |